United States Patent
Pang

(10) Patent No.: US 12,319,407 B2
(45) Date of Patent: *Jun. 3, 2025

(54) LIGHT KITE

(71) Applicant: Chi Kong Pang, Hong Kong (CN)

(72) Inventor: Chi Kong Pang, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,298

(22) Filed: Jan. 29, 2024

(65) Prior Publication Data

US 2024/0166346 A1 May 23, 2024

Related U.S. Application Data

(63) Continuation of application No. 17/295,056, filed as application No. PCT/CN2019/119331 on Nov. 19, 2019, now Pat. No. 11,897,605.

(30) Foreign Application Priority Data

Nov. 22, 2018 (HK) .................................. 18114984.9

(51) Int. Cl.
*B64C 31/06* (2020.01)
(52) U.S. Cl.
CPC .................................... *B64C 31/06* (2013.01)
(58) Field of Classification Search
CPC ............................... B64C 31/06; A63H 27/08
See application file for complete search history.

(56) References Cited

U.S. PATENT DOCUMENTS

| | | | | |
|---|---|---|---|---|
| 4,354,647 A * | 10/1982 | Carpenter | ............... | A63H 27/08 244/153 R |
| 5,000,401 A * | 3/1991 | Barone | ................... | A63H 27/08 D21/445 |
| 5,947,785 A * | 9/1999 | Bausch | ................... | A63H 29/18 446/61 |
| 2007/0084970 A1* | 4/2007 | Carlson | .................. | A63H 27/08 244/153 R |

OTHER PUBLICATIONS https://www.pulixin.com/blister-packaging-material-pp-plastic-film-roll.html; Pulxin Packaging Materials, Ltd. Description; website accessed 8/158/2024 (Year: 2024).*

* cited by examiner

*Primary Examiner* — Brady W Frazier
*Assistant Examiner* — Shanna Danielle Glover
(74) *Attorney, Agent, or Firm* — MUNCY, GEISSLER, OLDS & LOWE, P.C.

(57) ABSTRACT

The present invention provides a kite including a body, wherein the body includes a wing and a tying place; wherein the body of the kite includes a supporting member formed directly from the wing; and wherein the supporting member maintains a shape of the body. In one embodiment, the body is made of a blister material. In another embodiment, the body is made of a material capable of being embossed or indented.

14 Claims, 3 Drawing Sheets

LIGHT KITE

This application is a continuation application of U.S. Ser. No. 17/295,056 filed on May 19, 2021, which is a national stage of International Application No. PCT/CN2019/119331 filed on Nov. 19, 2019, which claims the benefits of Hong Kong Serial No. 18114984.9 filed on Nov. 22, 2018, the entire contents and disclosures of which are hereby incorporated by reference into this application.

TECHNICAL FIELD OF THE INVENTION

The present invention relates to a kite, and more particularly, to an integrally formed light kite.

BACKGROUND

Flying a kite is an activity suitable for both young and old people with a long history. Since ancient times, there have been various kite designs, such as soft-winged kites, three-dimensional kites, cross kites, folding kites, and the like. Although a boneless kite is popular in modern times, the boneless kite is only made of hard materials to form a three-dimensional shape. A structure of the boneless kite is still complex and difficult to produce. Generally, a kite needs additional horizontal and vertical supporting rods to make a kite frame so as to support the kite, and relatively professional technologies are needed to accurately balance the kite. Therefore, it is difficult for ordinary people to master a kite manufacturing technology. In terms of materials, a traditional kite is made of paper and bamboo, which are easily damaged. Although carbon fiber is used to manufacture the kite in the prior art to reduce a weight, a production cost of carbon fiber materials is high, and the carbon fiber material is fragile, so that the kite may be damaged easily in a case of falling to the ground. Moreover, most people like to add a pattern on the kite, which may cause a production difficulty. Therefore, it is absolutely necessary to improve the existing kite in view of the above problems.

SUMMARY OF THE INVENTION

In order to overcome the technical defects of complex structure, difficult mass production, heavy weight, inconvenient carrying, and easy damage of a kite in the prior art, the present invention provides a kite which is simple in structure, easy in production, low in production cost, and convenient in carrying.

The technical solutions used in the present invention for solving the technical problems are that:
  a light kite which includes a body, wherein the body includes a wing, a supporting member, and a tying place, the supporting member is arranged on the wing and integrally formed with the wing, the body of the kite is made of a blister material or a material capable of being embossed or indented, and the supporting member is made by blistering or embossing or indenting on the wing, so that the supporting member is integrally formed with the wing and maintains a shape of the body.

According to the light kite of the present invention, the supporting member is arranged on the wing transversely, vertically and/or obliquely relative to the wing.

According to the light kite of the present invention, the supporting member is arranged on the wing in a straight line and/or an arc line relative to the wing.

According to the light kite of the present invention, the wing consists of an upper wing and a lower wing, and the supporting member is arranged on the upper wing.

According to the light kite of the present invention, the wing consists of a left wing and a right wing, and the supporting members are symmetrically arranged on the left wing and the right wing.

According to the light kite of the present invention, the supporting member extends upwardly from a middle position of the body, and extends outwardly along an upper edge of the wing.

According to the light kite of the present invention, the supporting member protrudes in a downwind or upwind direction. Preferably, a cross-section of the supporting member is streamline.

According to the light kite of the present invention, the tying place is arranged at a position other than the supporting member or on the supporting member.

Further, the tying place is a through hole penetrating through the body. Preferably, one or two through holes are provided.

The present invention has the beneficial effects that: by adopting the above solutions, each supporting member is manufactured by a blistering method, so that a lot of existing kite production procedures may be omitted; and the integrally formed kite of the present invention does not need to be externally provided with a supporting rod, so that a weight of the kite is not increased.

In addition, a pattern may be printed on the body of the kite before blistering, with a simple structure, so that a color and a pattern of the kite may be clearly seen after flying into the air. The weight of the kite of the present invention is only an original weight of the blister material, which is just light and slim as needed by the material of the kite. On the other hand, the blister material or composite paper have a low cost, a high moldability, a durability, and a strong water resistance, and is very suitable for manufacturing the kite.

BRIEF DESCRIPTION OF THE DRAWINGS

The present invention is further described hereinafter with reference to the accompanying drawings and the embodiments, in which.

Figure 1:
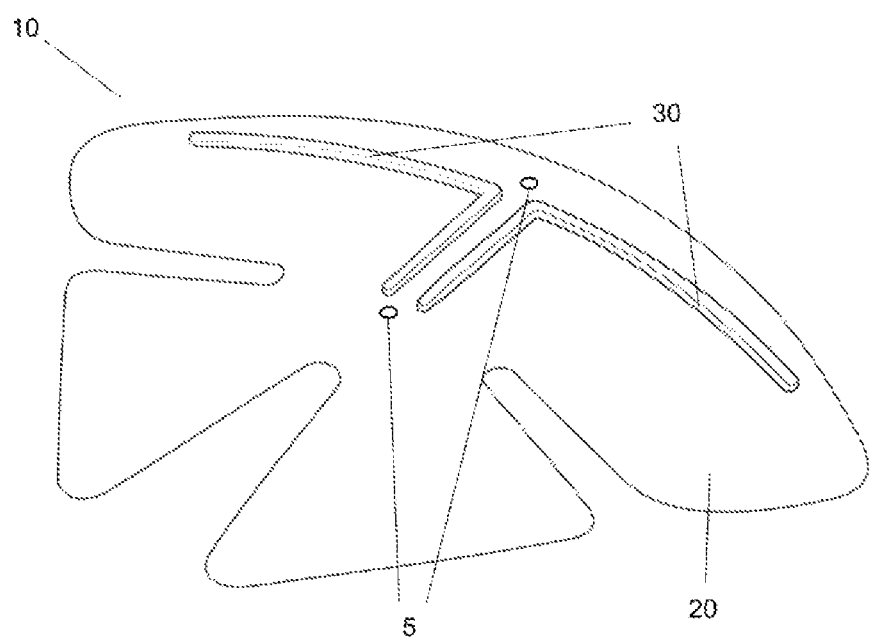
FIG. 1 is a schematic structure diagram of a kite of the present invention.

The description of the reference signs in the drawings:
10 the body;
20 the wing;
21 the upper wing;
22 the lower wing;
27 the left wing;
28 the right wing;
30 the support member;
5 the tying place.

DETAILED DESCRIPTION OF THE INVENTION

Figure 2:
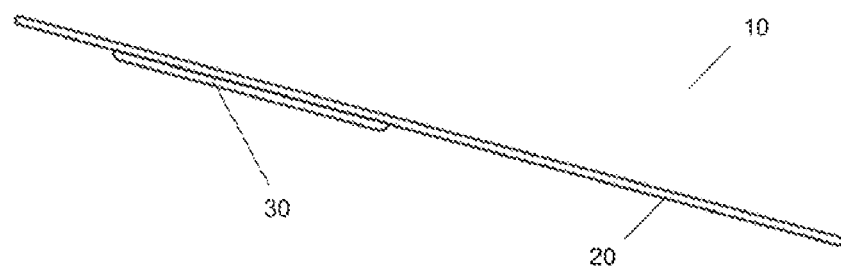
FIG. 2 is a side view of the kite of the present invention.

As shown in FIG. 1 and FIG. 2, an integrally formed kite of the present invention includes a body 10, and the body 10 includes a wing 20, a tying place 5, and a supporting member 30, and the supporting member 30 is integrally formed with the wing 20.

Preferably, the body 10 of the kite is made of a blister material or a material capable of being embossed or indented, and the supporting member 30 is made by blistering or embossing or indenting on the wing 20, so that the supporting member 30 is integrally formed with the wing 20 and maintains a shape of the body. For example, the material capable of being embossed or indented includes composite paper, such as PP and paper composite material, or YUPO paper, etc.

According to the kite of the present invention, the shape of the body 10 can be cut out according to a design in advance, and the shape may be a traditional wing shape or shapes of various plane kites in the prior art. As long as the supporting member 30 is made on the corresponding wing 20 according to the above method, a supporting rod in a traditional design may be replaced.

The kite of the present invention is mainly balanced when flying in terms of position and shape of the supporting member 30. Therefore, the supporting member 30 may be arranged on the wing 20 transversely, vertically and/or obliquely relative to the wing 20. Further, the supporting member 30 may be arranged on the wing 20 in a straight line or an arc line relative to the wing 20, so that the kite has different appearances.

In order to achieve a better balance effect of the kite of the present invention, a cross-section of the supporting member 30 is set to be streamline, and after the supporting member 30 is integrally formed, the supporting member 30 may protrude in a downwind or upwind direction. This design can reduce turbulences formed on the supporting member 30 when the air flows through the body 10 of the kite, and maintains the kite flying smoothly.

In an embodiment of the present invention, the tying place 5 of the kite is a through hole penetrating through the body. Preferably, the tying place 5 is arranged at a position other than the supporting member 30 to avoid weakening a supporting effect of the supporting member 30. Or, the tying place 5 can be positioned on the supporting member 30. Certainly, the through hole may also be arranged in the supporting member 30 as needed. Preferably, a number of the tying places 5 may be set according to a situation, for example, one tying place 5, two tying places 5, or three tying places 5 may be provided.

Figure 3:
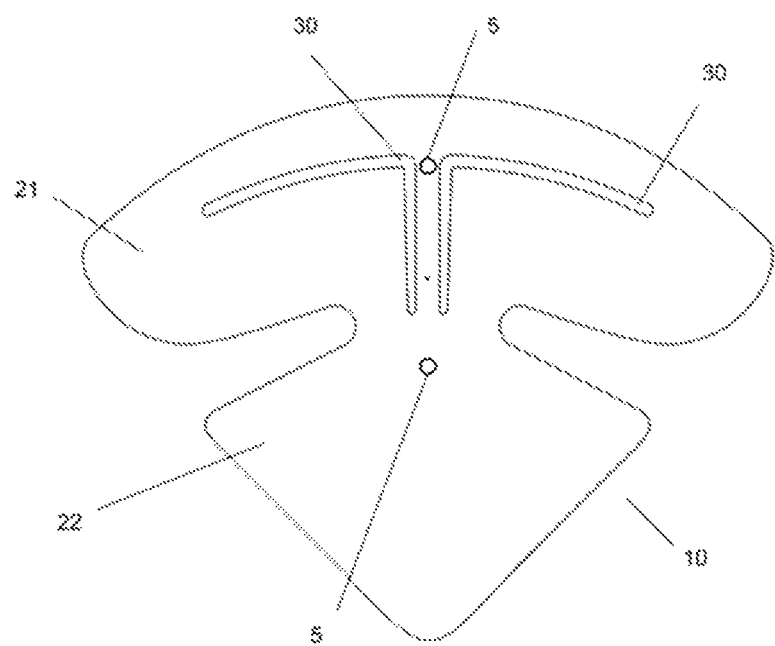
FIG. 3 is a schematic structure diagram of a preferred embodiment of the present invention.

As shown in FIG. 3, in an embodiment of the present invention, the wing 20 consists of an upper wing 21 and a lower wing 22, the supporting member 30 is arranged on the upper wing 21, and the tying place 5 is also arranged on the upper wing 21.

Figure 4:
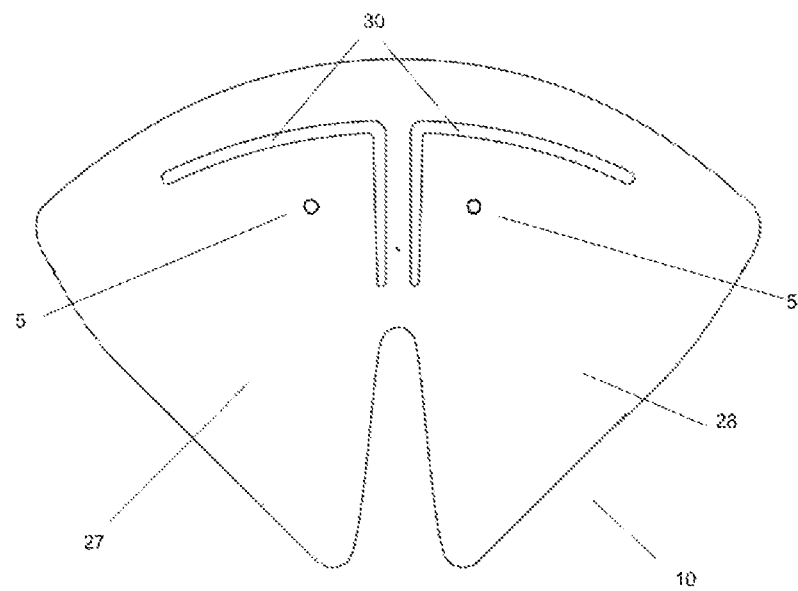
FIG. 4 is a schematic structure diagram of a preferred embodiment of the present invention.

As shown in FIG. 4, in an embodiment of the kite of the present invention, the wing 20 consists of a left wing 27 and a right wing 28, and the supporting members 30 are symmetrically arranged on the left wing 27 and the right wing 28.

Figure 5:
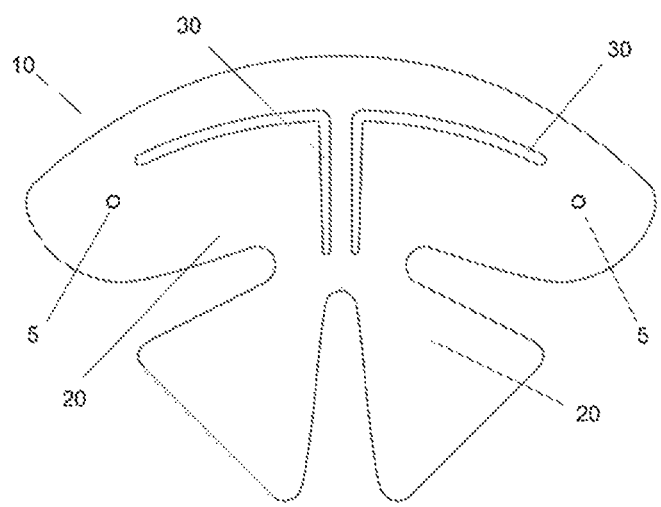
FIG. 5 is a schematic structure diagram of a preferred embodiment of the present invention.

FIG. 5 is a schematic structure diagram of a preferred embodiment of the kite of the present invention, the supporting member 30 extends upwardly from a middle position of the body 10, and extends outwardly along an upper edge of the wing 20. The supporting member 30 is V-shaped, so that the body 10 of the kite may be supported transversely and longitudinally, and deformation of the kite can be reduced, thus enhancing a balance force of the kite. Preferably, a position of the tying place 5 is closer to an outer edge of the wing 20 than the supporting member 30, which may make the kite obtain better windward effect and stability.

Unless otherwise defined, all technical and scientific terms used in the text have the same meanings as those commonly understood by those skilled in the technical field of the present invention. The terms used in the specification of the present invention in the text are only for the purpose of describing the embodiments and are not used to limit the present invention. The term "and/or" used in the context includes any and all combinations of one or more associated listed items.

What is claimed is:

1. A kite comprising:
   a body, wherein the body comprises:
   a wing;
   a supporting member directly formed from the wing; and
   at least one tying place,
   wherein the supporting member maintains a shape of the body, and
   wherein the supporting member is integrally formed with the wing.

2. The kite according to claim 1, wherein the body is made of a blister material.

3. The kite according to claim 1, wherein the body is made of a material capable of being embossed or indented.

4. The kite according to claim 3, wherein the material capable of embossing or indenting includes composite paper, polypropylene (PP), paper composite material, or YUPO paper.

5. The kite according to claim 1, wherein the supporting member is arranged on the wing transversely, vertically and/or obliquely relative to the wing.

6. The kite according to claim 1, wherein the supporting member is arranged on the wing in a straight line and/or an arc line relative to the wing.

7. The kite according to claim 1, wherein the wing consists of an upper wing and a lower wing, and the supporting member is arranged on the upper wing.

8. The kite according to claim 1, wherein the wing consists of a left wing and a right wing, and the supporting members are symmetrically arranged on the left wing and the right wing.

9. The kite according to claim 8, wherein the supporting member extends upwardly from a middle position of the body, and extends outwardly along an upper edge of the wing from the left wing side to the right wing side so as to maintain the shape of the body.

10. The kite according to claim 1, wherein a cross-section of the supporting member is streamlined.

11. The kite according to claim 1, wherein the supporting member protrudes in a downwind or upwind direction.

12. The kite according to claim 1, wherein the tying place is arranged at a position other than the supporting member.

13. The kite according to claim 1, wherein the tying place is a through hole or a plurality of through holes penetrating through the body.

14. The kite according to claim 1, wherein the tying place is closer to an outer edge of the wing than the supporting member such that the kite obtains better windward effect and stability.

* * * * *